US012664831B2

(12) United States Patent
Santorelli et al.

(10) Patent No.: US 12,664,831 B2
(45) Date of Patent: Jun. 23, 2026

(54) SYSTEMS AND METHODS FOR DETERMINING DOWNTIME

(71) Applicant: Geotab Inc., Oakville (CA)

(72) Inventors: Michael Angelo David Santorelli, Concord (CA); Lourd Arun Raj, Pierrefonds (CA); Anh Tuan Tran, Toronto (CA); Paul Eugene Maida, Oakville (CA); Hannah Robertson Koke, Cambridge (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/300,868

(22) Filed: Aug. 15, 2025

(65) Prior Publication Data

US 2026/0051204 A1 Feb. 19, 2026

Related U.S. Application Data

(60) Provisional application No. 63/683,837, filed on Aug. 16, 2024.

(51) Int. Cl.
*G07C 5/02* (2006.01)
*G07C 5/00* (2006.01)

(52) U.S. Cl.
CPC ............... *G07C 5/02* (2013.01); *G07C 5/008* (2013.01)

(58) Field of Classification Search
CPC .......... G07C 5/02; G07C 5/008; G07C 5/006; G07C 5/0816; G07C 5/085
See application file for complete search history.

(56) References Cited

U.S. PATENT DOCUMENTS 9,812,015 B1 11/2017 Cox et al.
9,947,147 B1 * 4/2018 Kwak .................... G07C 5/008
11,741,760 B1 * 8/2023 Dubin ...................... G08G 1/13 340/990
11,823,504 B1 * 11/2023 Gulati .................... G07C 5/008
(Continued)

FOREIGN PATENT DOCUMENTS

DE 102021002078 A1 * 6/2021 .......... B60W 60/005
DE 102022001573 A1 * 7/2023 ........... G07C 5/0841
(Continued)

OTHER PUBLICATIONS

Extended European Search Report for European Application No. 25196271.8, mailed Oct. 20, 2025, 9 pages.

*Primary Examiner* — Babar Sarwar
(74) *Attorney, Agent, or Firm* — Gabriel F. Rogers

(57) ABSTRACT

Disclosed herein are systems and methods for determining vehicle downtime. In one embodiment, such a method comprises operating at least one processor to: receive telematics data originating from a plurality of telematics devices installed in a plurality of vehicles; identify, using the telematics data, an unpowered trip completed by at least one vehicle of the plurality of vehicles; identify each unpowered trip completed by the at least one vehicle that is a tow trip; identify, for each vehicle that completed a tow trip, a first powered trip completed prior to the tow trip and a second powered trip completed after the tow trip; and determine, for each vehicle that completed a tow trip, a vehicle downtime based at least in part on a time difference between an end time of the first powered trip and an start time of the second powered trip.

21 Claims, 5 Drawing Sheets

(56) References Cited

U.S. PATENT DOCUMENTS

| | | | | |
|---|---|---|---|---|
| 11,922,734 | B1 * | 3/2024 | Kellett | G07C 5/085 |
| 12,211,010 | B2 * | 1/2025 | Saito | G06Q 10/20 |
| 12,347,242 | B1 * | 7/2025 | Bryukhan | G07C 5/085 |
| 2007/0203637 | A1 * | 8/2007 | Passman | G06Q 10/06 701/117 |
| 2011/0082816 | A1 * | 4/2011 | Moffett | G06Q 30/0283 705/400 |
| 2013/0164715 | A1 * | 6/2013 | Hunt | G09B 9/052 434/65 |
| 2014/0277902 | A1 * | 9/2014 | Koch | G07C 5/008 701/29.1 |
| 2015/0161554 | A1 * | 6/2015 | Sweeney | G06Q 50/40 705/7.15 |
| 2016/0104328 | A1 * | 4/2016 | Chen | G07C 5/0858 701/414 |
| 2016/0112216 | A1 * | 4/2016 | Sargent | G07C 5/008 370/328 |
| 2016/0121669 | A1 * | 5/2016 | Xu | B60W 40/12 340/449 |
| 2017/0039784 | A1 | 2/2017 | Gelbart et al. | |
| 2017/0091890 | A1 * | 3/2017 | Hirose | G06Q 50/10 |
| 2017/0144671 | A1 * | 5/2017 | Memani | B60W 40/09 |
| 2017/0169634 | A1 * | 6/2017 | Mattern | G07C 5/0841 |
| 2017/0200329 | A1 * | 7/2017 | Rajakondala | G01S 19/52 |
| 2018/0059687 | A1 * | 3/2018 | Hayes | G01C 21/3407 |
| 2019/0025856 | A1 * | 1/2019 | Turato | G08G 1/22 |
| 2019/0273869 | A1 * | 9/2019 | Ramalingam | H04N 19/513 |
| 2020/0309544 | A1 * | 10/2020 | Ozturk | G01C 21/3626 |
| 2021/0042705 | A1 * | 2/2021 | Suen | G06Q 10/0838 |
| 2021/0103288 | A1 * | 4/2021 | Nemedi | G06Q 10/047 |
| 2021/0110323 | A1 * | 4/2021 | Munoz | G06Q 10/06311 |
| 2021/0110480 | A1 * | 4/2021 | Kwak | G07C 5/008 |
| 2021/0114554 | A1 * | 4/2021 | Chen | G07C 5/0825 |
| 2021/0304098 | A1 * | 9/2021 | Yang | G01C 21/3415 |
| 2022/0146456 | A1 * | 5/2022 | Brandon | H04R 1/406 |
| 2022/0207450 | A1 * | 6/2022 | Francis | G06F 16/2455 |
| 2022/0228875 | A1 * | 7/2022 | Cao | G01C 21/3453 |
| 2022/0308577 | A1 * | 9/2022 | Pasch | H04W 4/46 |
| 2022/0318766 | A1 * | 10/2022 | Saito | G06Q 10/20 |
| 2023/0096960 | A1 * | 3/2023 | Maeda | G06Q 10/20 705/305 |
| 2023/0109739 | A1 | 4/2023 | Lee et al. | |
| 2023/0342861 | A1 * | 10/2023 | LeFebre | G06Q 30/0283 |
| 2023/0368673 | A1 * | 11/2023 | Rusciano | G08G 1/0137 |
| 2024/0005286 | A1 * | 1/2024 | Gerrese | G07C 5/006 |
| 2024/0086948 | A1 * | 3/2024 | Bruchhardt | G06Q 30/0202 |
| 2024/0255940 | A1 * | 8/2024 | Halbe | F02D 41/222 |
| 2024/0304092 | A1 * | 9/2024 | Brandon | G08G 1/202 |
| 2024/0412566 | A1 * | 12/2024 | King | G07C 5/008 |
| 2024/0420518 | A1 * | 12/2024 | Everly | G07C 5/008 |
| 2025/0086399 | A1 * | 3/2025 | Harvey | G06Q 40/08 |
| 2025/0265519 | A1 * | 8/2025 | Shen | G06Q 50/40 |
| 2025/0278702 | A1 * | 9/2025 | Mah | G07C 5/0816 |
| 2025/0284582 | A1 * | 9/2025 | Andreasen | G07C 5/0841 |

FOREIGN PATENT DOCUMENTS

| | | | | |
|---|---|---|---|---|
| EP | 3048691 A1 | * | 7/2016 | H02J 7/00 |
| EP | 4407173 A2 | * | 7/2024 | G05B 23/0283 |
| ES | 2732249 T3 | * | 11/2019 | G07C 5/0816 |
| JP | 2020166760 A | * | 10/2020 | G06Q 10/0637 |
| RU | 2834450 C1 | * | 2/2025 | |
| WO | WO-2014086449 A1 | * | 6/2014 | H04L 67/12 |
| WO | WO-2019084282 A1 | * | 5/2019 | B60W 40/09 |
| WO | WO-2022072522 A1 | * | 4/2022 | G07C 5/006 |
| WO | WO-2024061446 A1 | * | 3/2024 | G06Q 10/20 |

* cited by examiner

SYSTEMS AND METHODS FOR DETERMINING DOWNTIME

CROSS-REFERENCE TO RELATED APPLICATIONS

This application claims priority to and the benefit of U.S. Patent Application Ser. No. 63/683,837, filed on Aug. 16, 2024, which is hereby incorporated by reference in its entirety.

TECHNICAL FIELD

The present disclosure generally relates to vehicle maintenance. More specifically, the present disclosure relates to the determination of vehicle downtime using telematics data.

BACKGROUND

Vehicle downtime represents the amount of time that a vehicle is non-operational due to, for example, planned or unplanned maintenance. Most, if not all, vehicle owners, generally try to minimize vehicle downtime due to the costs associated therewith—e.g., costs associated with the maintenance, costs associated with being unable to use the vehicle, etc. As will be appreciated, such costs may be compounded for fleet managers that are managing a vehicle fleet, as a plurality of vehicles may experience downtime within a given time period.

However, vehicle downtime may generally be difficult to identify and track. For example, using conventional techniques that may identify vehicles that are "offline", a fleet manager may not be able to differentiate between vehicle downtime (e.g., as caused by planned or unplanned maintenance) and time periods where an operational vehicle is simply not in use (e.g., due to a vehicle operator being on vacation). As a result, fleet managers may not be able to, for example, accurately measure total downtime across their fleet of vehicles, determine the impact of vehicle downtime on their fleet of vehicles (e.g., the amount of downtime caused by unplanned maintenance), etc. As will be appreciated, such information may be particularly useful for fleet managers managing a fleet of hundreds or thousands of vehicles.

A need therefore exists for improved systems and methods for determining vehicle downtime.

SUMMARY

In one aspect, the present disclosure relates to a system for determining vehicle downtime, the system comprising: at least one data storage operable to store telematics data originating from a plurality of telematics devices installed in a plurality of vehicles; and at least one processor in communication with the at least one data storage, the at least one processor operable to: identify, using the telematics data, an unpowered trip completed by at least one vehicle of the plurality of vehicles; identify each unpowered trip completed by the at least one vehicle that is a tow trip; identify, for each vehicle that completed a tow trip, a first powered trip completed prior to the tow trip and a second powered trip completed after the tow trip; and determine, for each vehicle that completed a tow trip, a vehicle downtime based at least in part on a time difference between an end time of the first powered trip and an start time of the second powered trip.

According to an embodiment, the at least one processor is operable to identify the unpowered trip based on a change in location of the at least one vehicle without an ignition thereof being engaged, without a change in engine RPM, without a change in engine road speed, without a change in odometer values, without an indicative debug log, or a combination thereof.

According to an embodiment, the indicative debug log comprises a debug log indicating a relatively high voltage reading while the ignition of the at least one vehicle is disengaged.

According to an embodiment, the at least one processor is operable to identify each unpowered trip that is the tow trip by determining that an endpoint of the unpowered trip is a service center.

According to an embodiment, the at least one processor is operable to determine that the endpoint of the unpowered trip is the service center by determining that the endpoint of the unpowered trip is located proximate or within a service center zone.

According to an embodiment, the at least one processor is operable to identify each unpowered trip that is the tow trip by filtering each unpowered trip based on a maximum speed of the at least one vehicle during the unpowered trip, a total duration of the unpowered trip, a total distance of the unpowered trip, a change in odometer values of the at least one vehicle as compared to the total distance of the unpowered trip, a change in odometer values of the at least one vehicle after the unpowered trip, or a combination thereof.

According to an embodiment, the at least one processor is operable to identify each unpowered trip that is the tow trip by validating each unpowered trip as the towed trip by inputting into at least one machine learning model one or more telematics data features related to the unpowered trip.

According to an embodiment, the one or more telematics data features related to the unpowered trip comprise a difference in odometer values after the unpowered trip, a total time of the unpowered trip, a total distance of the unpowered trip, an ignition status during the unpowered trip, a geographical distance between a start point and an endpoint of the unpowered trip, telematics device debug logs obtained during the unpowered trip, a CAN Bus error detected during the unpowered trip, the installation status of the telematics device after the unpowered trip, a CAN Bus error detected after the unpowered trip, a maximum speed of the vehicle during the unpowered trip, an RPM value before the unpowered trip, an RPM value after the unpowered trip, a transmission gear value during the unpowered trip, a telematics device status during the unpowered trip, a fault code detected during the unpowered trip, a fault code detected after the unpowered trip, or a combination thereof.

According to an embodiment, the at least one processor is operable to identify the first powered trip and the second powered trip based on a change in location of the at least one vehicle with an ignition thereof is engaged, with a change in engine RPM, with a change in engine road speed, with a change in odometer values, without an indicative debug log, or a combination thereof.

According to an embodiment, the first powered trip occurs immediately before the unpowered trip and the second powered trip occurs immediately after the unpowered trip.

In another aspect, the present disclosure relates to a method for determining vehicle downtime, the method comprising operating at least one processor to: receive telematics data originating from a plurality of telematics devices installed in a plurality of vehicles; identify, using the telematics data, an unpowered trip completed by at least one vehicle of the plurality of vehicles; identify each unpowered trip completed by the at least one vehicle that is a tow trip; identify, for each vehicle that completed a tow trip, a first powered trip completed prior to the tow trip and a second powered trip completed after the tow trip; and determine, for each vehicle that completed a tow trip, a vehicle downtime based at least in part on a time difference between an end time of the first powered trip and an start time of the second powered trip.

According to an embodiment, the identifying of the unpowered trip completed by the at least one vehicle comprises operating the at least one processor to identify the unpowered trip based on a change in location of the at least one vehicle without an ignition thereof being engaged, without a change in engine RPM, without a change in engine road speed, without a change in odometer values, without an indicative debug log, or a combination thereof.

According to an embodiment, the indicative debug log comprises a debug log indicating a relatively high voltage reading while the ignition of the at least one vehicle is disengaged.

According to an embodiment, the identifying of each unpowered trip that is the tow trip comprises operating the at least one processor to determine that an endpoint of the unpowered trip is a service center.

According to an embodiment, the determining that the endpoint of the unpowered trip is the service center comprises operating the at least one processor to determine that the endpoint of the unpowered trip is located proximate or within a service center zone.

According to an embodiment, the identifying of each unpowered trip that is the tow trip comprises operating the at least one processor to filter each unpowered trip based on a maximum speed of the at least one vehicle during the unpowered trip, a total duration of the unpowered trip, a total distance of the unpowered trip, a change in odometer values of the at least one vehicle as compared to the total distance of the unpowered trip, a change in odometer values of the at least one vehicle after the unpowered trip, or a combination thereof.

According to an embodiment, the identifying of each unpowered trip that is the tow trip comprises operating the at least one processor to validate each unpowered trip as the towed trip by inputting into at least one machine learning model one or more telematics data features related to the unpowered trip.

According to an embodiment, the one or more telematics data features related to the unpowered trip comprise a difference in odometer values after the unpowered trip, a total time of the unpowered trip, a total distance of the unpowered trip, an ignition status during the unpowered trip, a geographical distance between a start point and an endpoint of the unpowered trip, telematics device debug logs obtained during the unpowered trip, a CAN Bus error detected during the unpowered trip, the installation status of the telematics device after the unpowered trip, a CAN Bus error detected after the unpowered trip, a maximum speed of the vehicle during the unpowered trip, an RPM value before the unpowered trip, an RPM value after the unpowered trip, a transmission gear value during the unpowered trip, a telematics device status during the unpowered trip, a fault code detected during the unpowered trip, a fault code detected after the unpowered trip, or a combination thereof.

According to an embodiment, the at least one processor is operable to identify the first powered trip and the second powered trip based on a change in location of the at least one vehicle with an ignition thereof is engaged, with a change in engine RPM, with a change in engine road speed, with a change in odometer values, without an indicative debug log, or a combination thereof.

According to an embodiment, the first powered trip occurs immediately before the unpowered trip and the second powered trip occurs immediately after the unpowered trip.

In another aspect, the present disclosure relates to a non-transitory computer-readable medium having instructions stored thereon executable by at least one processor to implement the methods described herein.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Vehicle downtime is a significant issue for vehicle owners. As described herein, vehicle downtime represents the time that a vehicle is non-operational and/or unable to perform the intended function thereof. For example, a vehicle may experience downtime due to planned maintenance (e.g., routine maintenance), unplanned maintenance (e.g., maintenance required due to a collision), and the like.

As will be appreciated, a non-operational vehicle often incurs a cost to the owner thereof. For example, for a logistics company, a vehicle that is non-operational may not be able to transport freight and, in turn, may not be able to generate revenue for the company. As well, the non-operational vehicle may incur further costs resulting the maintenance required to render the vehicle operational again.

Thus, it may be useful for a vehicle owner to track vehicle downtime, identify a cause of the vehicle downtime, estimate the impact of vehicle downtime, etc. In particular, it may be useful for, for example, fleet managers to identify and/or determine such metrics, as the costs associated with vehicle downtime may be significantly compounded if the fleet manager manages a fleet of hundreds or thousands of vehicles.

However, conventional techniques may only be able to identify that a vehicle is "offline". That is, conventional techniques may identify that a vehicle is not active but may not be able to distinguish between different causes of the vehicle inactivity. For example, using such conventional techniques, a user may be able to determine that one or more vehicles are inactive but may not be able to determine whether the inactivity is due to maintenance (e.g., planned or unplanned maintenance) or instead due to, for example, a vehicle operator being off-shift.

Thus, it is an objective of the present disclosure to provide advantageous systems and methods for determining vehicle downtime that are capable of avoiding the shortcomings of the conventional techniques. For example, in some embodiments, the systems and methods of the present disclosure are capable of distinguishing between vehicles that are inactive or "offline" and vehicles that are experiencing vehicle downtime due to maintenance (e.g., planned or unplanned maintenance). As a result, a user (e.g., a fleet manager) of the systems and methods described herein may be able to, in turn, be able to more easily and remotely track vehicle downtime, estimate the impact of total vehicle downtime on a vehicle fleet, etc.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Figure 1:
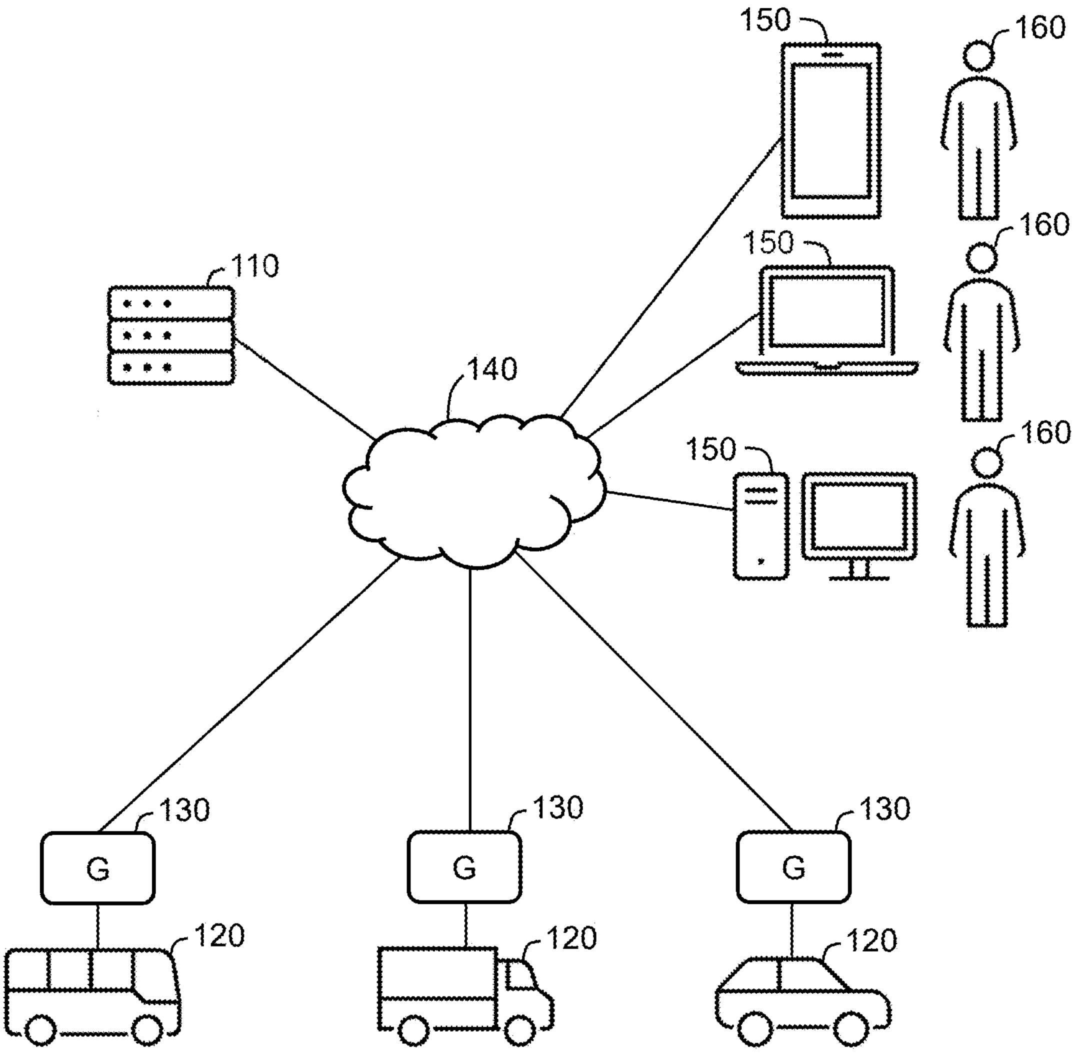
FIG. 1 is a block diagram of various components interacting with an example fleet management system according to an embodiment of the present disclosure.

Referring now to FIG. 1, there is shown an example of a fleet management system 110 for managing a plurality of assets equipped with a plurality of telematics devices 130. Each of the telematics devices 130 is capable of collecting various data from the vehicles 120 (i.e., telematics data) and sharing the telematics data with the fleet management system 110. The fleet management system 110 may be remotely located from the telematics devices 130 and the vehicles 120.

The vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicles 120. For example, the vehicle data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicles 120, such as, but not limited to, trip distances and times, idling times, harsh braking and driving, usage rates, fuel economy, and the like. Various data analytics may be implemented to process the telematics data. The telematics data may then be used to manage various aspects of the vehicles 120, such as route planning, vehicle maintenance, driver compliance, asset utilization, fuel management, etc., which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicles 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
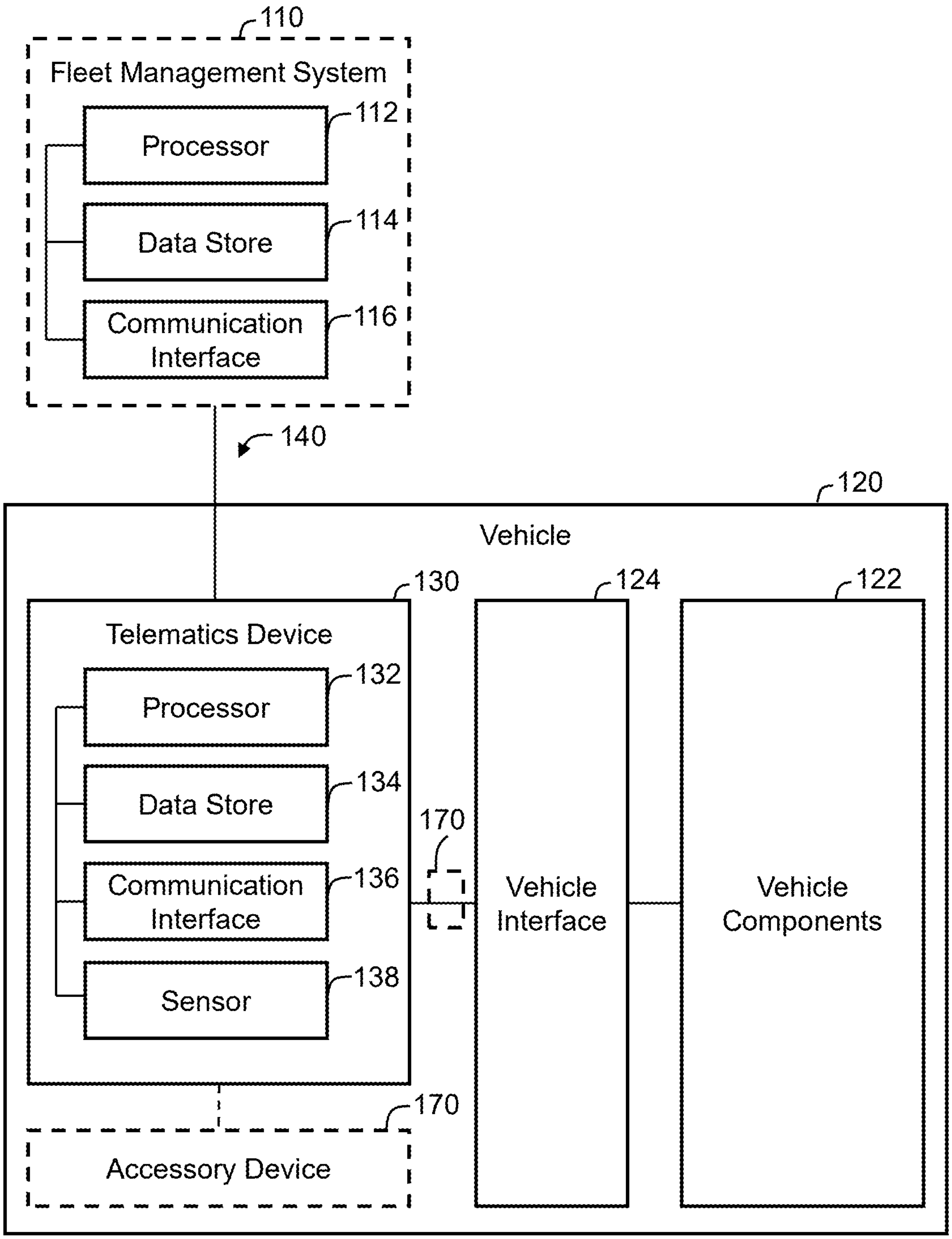
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
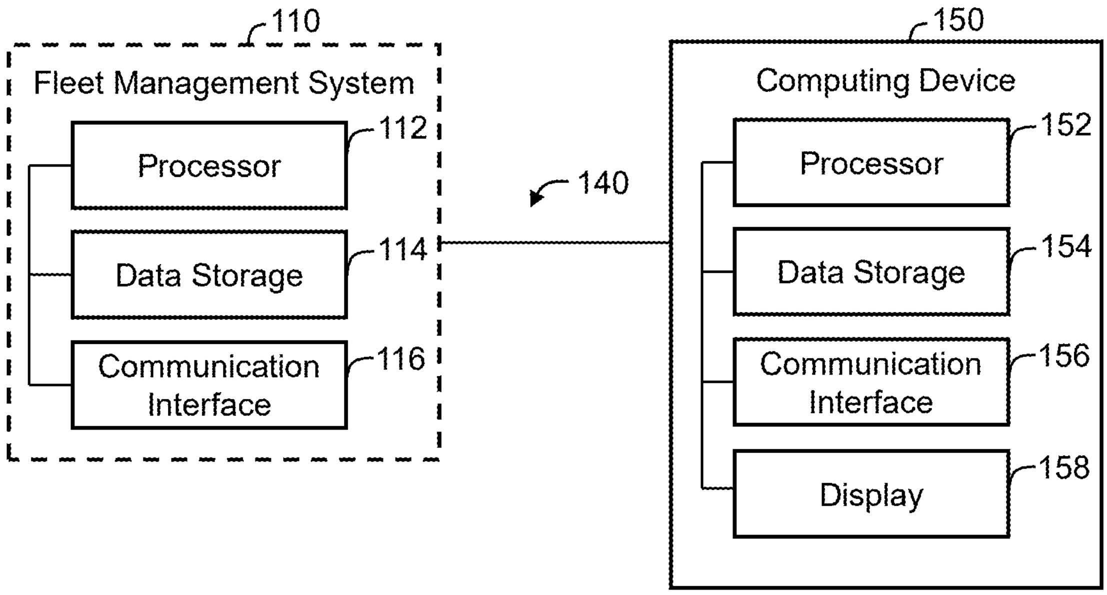
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
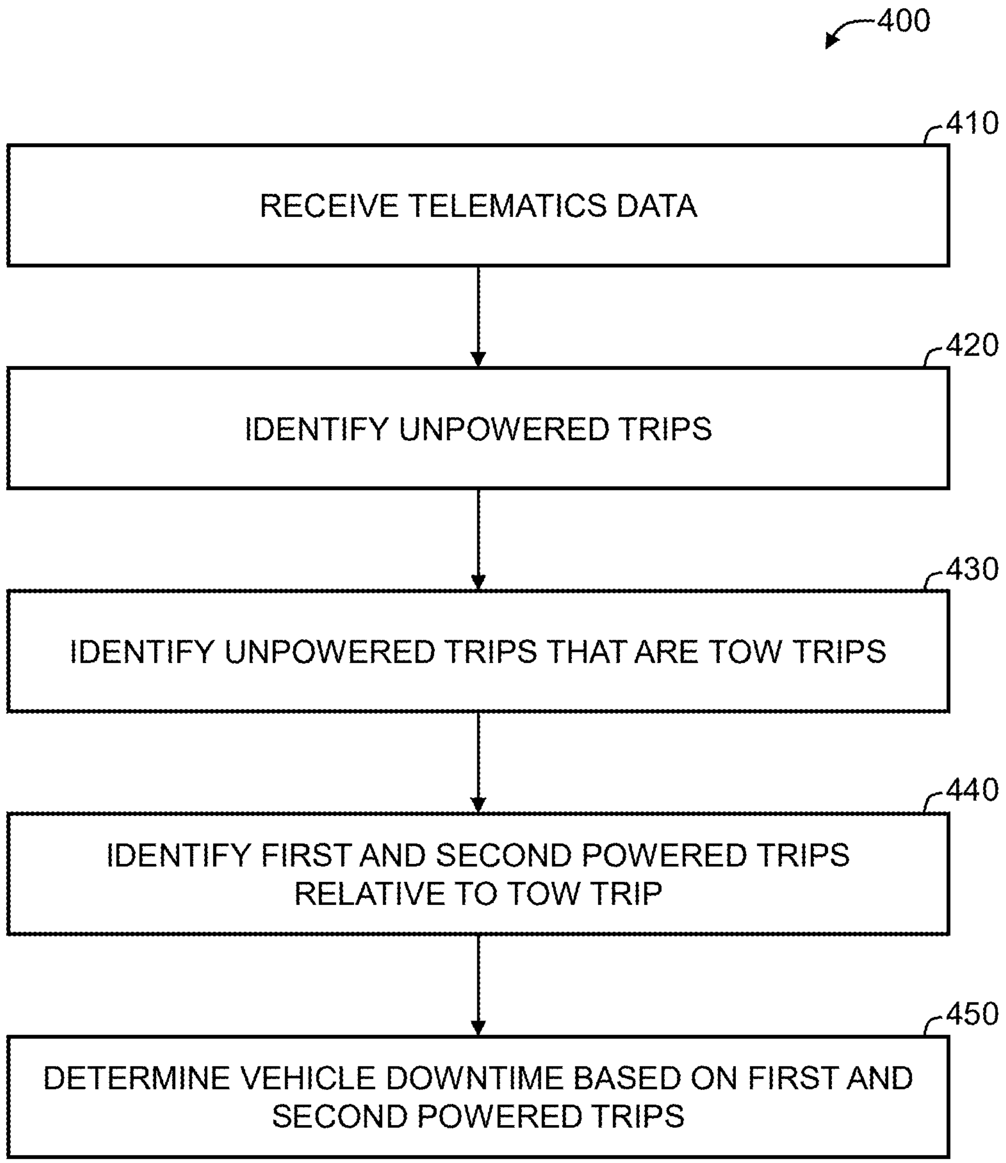
FIG. 4 is a flowchart of an example method for determining vehicle downtime, according to an embodiment of the present disclosure.

Referring now to FIG. 4, there is shown a flow chart of an example method for determining vehicle downtime (400) according to an embodiment of the present disclosure. As shown, the method 400 may comprise operating at least one processor to: receive telematics data originating from a plurality of telematics devices installed in a plurality of vehicles (410); identify, using the telematics data, an unpowered trip completed by at least one vehicle of the plurality of vehicles (420); identify each unpowered trip completed by the at least one vehicle that is a tow trip (430); identify, for each vehicle that completed a tow trip, a first powered trip completed prior to the tow trip and a second powered trip completed after the tow trip (440); and determine, for each vehicle that completed a tow trip, a vehicle downtime based at least in part on a time difference between an end time of the first powered trip and a start time of the second powered trip (450).

The method 400 may be implemented using any suitable combination of hardware and software, such as those described in reference to FIG. 1 to FIG. 3. For example, one or more operations (e.g., operations 410, 420, 430, 440, and/or 450) of the method 400 may be implemented at the fleet management system 110 (e.g., by the processor 112 executing instructions stored on the data storage 114), at the telematics devices 130 (e.g., by the processor 132 executing instructions stored on the data storage 134), at the computing devices 150 (e.g., by the processor 152 executing instructions stored on the data storage 154), or a combination thereof. As will be appreciated, because the systems and methods of the present disclosure may involve the processing of large amounts of telematics data (e.g., telematics data originating from a vehicle fleet of tens, hundreds, or even thousands of vehicles), the systems and methods of the present disclosure require implementation via a computer (e.g., one or more of the processors 112, 132, and 152).

In embodiments where at least a portion of the method 400 is implemented by a fleet management system (e.g., the fleet management system 110), less processing may be executed by telematics devices (e.g., the telematics devices 130) and/or other computing devices (e.g., the computing devices 150). As a result, the hardware complexity of the telematics devices and/or the other computing devices may be reduced, which, in turn, may reduce the costs associated therewith. As well, it may also in some cases be easier to update and/or modify software running on a fleet management system as compared to telematics devices and/or other computing devices. On the other hand, in embodiments where at least a portion of the method 400 is implemented by telematics devices, less data may be transmitted to a fleet management system and/or other computing devices, thereby reducing network usage and network bandwidth. As will be appreciated, in such implementations, usage costs associated with network usage may in turn also be reduced. Thus, the method 400 may be implemented in a variety of ways and each implementation may have advantages associated therewith.

As shown in FIG. 4 at 410, telematics data originating from a plurality of telematics devices installed in a plurality of vehicles may be received. The telematics data may be obtained from the plurality of vehicles using, for example, one or more of the systems outlined in FIG. 1 to FIG. 3. For example, the telematics device 130 (e.g., the processor 132) may receive telematics data from the sensor 138, vehicle components 122, or a combination thereof. Alternatively, or additionally, the fleet management system 110 (e.g., the processor 112) may receive telematics data from the telematics device 130. Additionally, or alternatively, the computing device 150 (e.g., the processor 152) may receive telematics data from the telematics device 130 and/or the fleet management system 110. Additionally, or alternatively, the telematics device 130, the fleet management system 110, and/or the computing device 150 may receive telematics data from one or more data storages (e.g., one or more of the data storages 114, 134, 154).

As described herein, the telematics data may be used in some embodiments to identify different types of trips, as well as details and/or metrics related thereto, completed by a plurality of vehicles. For example, the telematics data may be used to identify a start point of a trip, an end point of a trip, a start time of a trip, an end time of a trip, or a combination thereof. As well, the telematics data may be used to identify vehicles completing the trips and may therefore include vehicle identify information such as vehicle identification numbers (VINs). Further, the telematics data may be used to distinguish between a powered trip completed by a vehicle and an unpowered trip completed by a vehicle. As described herein, such a distinction may be based on telematics data such as, but not limited to, engine data (e.g., engine RPM data, ignition data, engine road speed data, etc.), odometer data (e.g., odometer values), telematics device data (e.g., telematics device status data), and the like.

In some embodiments, the telematics data may be preprocessed prior to and/or subsequently to being received. For example, the telematics data may be received in one or more various formats, standards, or protocols. In some cases, it may be beneficial to reformat the telematics data prior to use in the systems and methods of the present disclosure. As a further example, the telematics data may include datapoints reported at irregular frequencies and/or that correspond to mismatched points in time. In such cases, the telematics data may be interpolated so that the datapoints in each time series correspond to successive and/or equally spaced points in time. As a yet further example, and as will be described herein, the telematics data may be curve-logged telematics data, which may result in a reduced number of received datapoints. In such implementations, the reduced number of datapoints may be interpolated to provide a fulsome dataset.

At operation 420 of the method 400, an unpowered trip completed by at least one vehicle of the plurality of vehicles may be identified using the telematics data. As used herein, "unpowered trip" refers to a trip completed by a vehicle (i.e., a change in location) that was not caused by the propulsion system of the vehicle (e.g., an engine or a battery). For example, a vehicle that changes locations without the engine thereof operating may be considered an unpowered trip. As well, by identifying an unpowered trip, the systems and methods of the present disclosure may be capable of distinguishing between vehicles that are "offline" (e.g., parked but still functional) and those that are experiencing downtime, as will be described in greater detail below.

In more detail, an unpowered trip completed the at least one vehicle may be identified using telematics data such as, but not limited to, engine data, odometer data, telematics device data, etc. For example, a vehicle that changes location while the engine data indicates that the ignition thereof was not engaged (i.e., turned "on") may indicate an unpowered trip was completed thereby. As another example, a vehicle that changes location without a change in odometer values or a change in odometer values that does not correlate to the change in location (e.g., the vehicle is moved 5 miles but the odometer values only increase by 1 mile) may also indicate an unpowered trip was completed thereby.

Thus, in some embodiments, the identifying of the unpowered trip may be based on a change in location of the at least one vehicle without an ignition thereof being engaged, without a change in engine RPM, without a change in engine road speed (i.e., based on the rotation of the wheels of the vehicle), without a change in odometer values, or a combination thereof.

Another type of telematics data that may be used to identify an unpowered trip completed by at least one of the plurality of vehicles is telematics device data. As described herein, telematics device data may include data pertaining to the telematics device installed in the at least one vehicle. For example, if a vehicle changes location without the telematics device "waking up", it may indicate that the vehicle was not powered. As another example, the telematics device may produce certain debug logs that may be indicative of the completion of an unpowered trip. One example of such an indicative debug log is one that indicates that a relatively high voltage was observed while the ignition of the at least one vehicle was disengaged. As will be appreciated, a vehicle battery generally operates at an expected voltage when the vehicle ignition is engaged or disengaged. If a vehicle battery is operating at an unexpected voltage when the ignition is disengaged (i.e., a voltage that is higher than expected), it may indicate the wheels of the vehicle are turning and, in turn, charging the vehicle battery while the vehicle is unpowered.

Referring now to operation 430 of FIG. 4, each unpowered trip completed by the at least one vehicle that is a tow trip may be identified. As will be appreciated, there may be a number of reasons for a vehicle to complete an unpowered trip. One example of a reason for a vehicle to complete an unpowered trip is that the vehicle has been towed. As will be appreciated, when a vehicle is towed by, for example, a tow truck, the location of the vehicle changes without the vehicle operating—i.e., without the propulsion system thereof. In such cases, the unpowered trip may be considered a "tow trip".

As will also be appreciated, the identification of unpowered trips that are tow trips may be useful, as the towing of a vehicle may indicate that the vehicle requires maintenance of some variety and may, in turn, indicate that the vehicle is experiencing downtime. However, there may be other reasons for a vehicle to complete an unpowered trip. For example, a vehicle may be transported on a transport truck (e.g., from a manufacturer to a dealership), travelling on a ferry, and/or sliding or drifting on a surface (e.g., sliding down an icy hill), etc. Such examples may not be indicative of vehicle downtime due to, for example, planned maintenance or unplanned maintenance.

Thus, in some embodiments, the identifying of each unpowered trip that is the tow trip may comprise operating the at least one processor to determine that an endpoint of the unpowered trip is a service center. As will be appreciated, an unpowered trip that ends at a service center (i.e., a location at which vehicle maintenance may be performed) may indicate that the vehicle was towed due to a need for maintenance and is, in turn, experiencing vehicle downtime.

In one embodiment, the determining that the endpoint of the unpowered trip is the service center comprises operating the at least one processor to determine that the endpoint of the unpowered trip is located proximate or within a service center zone. Service center zones represent an area, or zone, within which a service center is located and may be identified using, for example, map data provided by a map information provider such as OpenStreetMaps (OSM). However, in some cases, service centers or service center zones may not be indicated in map data. In such cases, it may instead be useful to identify service center zones using the telematics data obtained from the plurality of telematics devices installed in the plurality of vehicles.

For example, in some embodiments, a service center zone may be identified by operating the at least one processor to: determine for each of the plurality of vehicles, using the telematics data, when a vehicle maintenance event has occurred by identifying at least a binary vehicle status indicator change, time-logged telematics data that meets a predetermined condition, an indication that a vehicle diagnosis has occurred, or a combination thereof; determine, using the telematics data, a location of each of the plurality of vehicles at a time at which the vehicle maintenance event occurred; and identify one or more service centers by: applying to a plurality of maintenance event locations a clustering model, and classifying one or more clusters of maintenance event locations as a service center zone. In such embodiments, the binary vehicle status indicator change may comprise a change in vehicle warning lights, a change in diagnostic trouble codes (DTCs), or a combination thereof; the time-logged telematics data may comprise engine oil quality data, battery data, fluid level data, or a combination thereof; the predetermined condition may comprise an increase in engine oil quality and/or a fluid level that is greater than a predetermined threshold; and the indication that the vehicle diagnosis has occurred may comprise an indication that a diagnostic tool has communicated with a vehicle interface.

In some embodiments, the identifying of each unpowered trip that is the tow trip may be based on telematics data obtained from the at least one vehicle before the unpowered trip, during the unpowered trip, and/or after the unpowered trip. For example, in such embodiments, if the telematics data indicates that an unpowered trip may be due to a reason other than towing (i.e., not a tow trip), that unpowered trip may be removed from further consideration by the systems and methods of the present disclosure.

The identifying of each unpowered trip that is the tow trip may, for instance, comprise operating the at least one processor to filter each unpowered trip based on a maximum speed of the at least one vehicle during the unpowered trip (e.g., a maximum speed below a selected threshold may indicate that the vehicle was not towed), a total duration of the unpowered trip (e.g., a duration of the unpowered trip greater than a selected threshold may indicate that the vehicle was not towed), a total distance of the unpowered trip (e.g., a distance of the unpowered trip greater that a selected threshold may indicate that the vehicle was not towed), a change in odometer values of the at least one vehicle as compared to the total distance of the unpowered trip (e.g., a change in odometer values that is greater than or equal to the unpowered trip may indicate that the vehicle was not towed), a decrease in odometer values of the at least one vehicle after the unpowered trip (e.g., indicative of data quality issues), etc., Filtering based on such telematics data may be useful for removing false positives caused by data quality issues, the vehicle sliding and/or drifting on a surface, etc.

In some embodiments, the identifying of each unpowered trip that is the tow trip may be performed using a machine learning model. For example, in such embodiments, wherein the identifying of each unpowered trip that is the tow trip may comprise operating the at least one processor to validate each unpowered trip as the towed trip by inputting into at least one machine learning model one or more telematics data features related to the unpowered trip. Examples of features of the telematics data that may be useful for validating that the unpowered trip is a towed trip include, but are not limited to, geospatial features, telematics device features, vehicle fault features, and the like.

In more detail, the one or more telematics data features may comprise features such as, but not limited to, a difference in odometer values after the unpowered trip, a total duration of the unpowered trip, a total distance of the unpowered trip, ignition status (e.g., engaged or disengaged) during the unpowered trip, a geographical distance between a start point and an endpoint of the unpowered trip, telematics device debug logs obtained during the unpowered trip, a CAN Bus error detected during the unpowered trip, the installation status of the telematics device after the unpowered trip, a CAN Bus error detected after the unpowered trip, a maximum speed of the vehicle during the unpowered trip, an RPM value before the unpowered trip, an RPM value after the unpowered trip, a transmission gear value during the unpowered trip (e.g., $1^{st}$ gear, $2^{nd}$ gear, neutral, etc.), a telematics device status during the unpowered trip, a fault code detected during the unpowered trip, a fault code detected after the unpowered trip, and the like.

In some embodiments, additional types of data features may be input into the machine learning model for validating the unpowered trip as a towed trip. For example, it may in some cases be useful to include meta-tow data features—e.g., data features relating to previous tow trip determinations for a vehicle. For example, it may be useful to include a total tow count for the vehicle, a date of last tow, or the like as a feature for input into the machine learning model. As will be appreciated, if a vehicle was towed relatively recently, it may indicate that the unpowered trip is not a tow, as it may be unlikely that the vehicle is in need of additional maintenance.

The machine learning model used is not particularly limited. For example, the machine learning model may comprise any suitable predictive machine learning model, classifier machine learning model, etc. For example, suitable machine learning models include random forest models, gradient boosting models, etc.

In some embodiments, the identifying of each unpowered trip that is the tow trip may comprise operating the at least one processor to: identify, using the telematics data, a zone traversed by the at least one vehicle during the unpowered trip; determine, for each zone traversed by the at least one vehicle, that the zone is a land zone or a water zone; determine, for each of the at least one vehicles, a water traversal metric indicating an amount of water traversed by the at least one vehicle during the unpowered trip; and determine that the unpowered trip is the tow trip based at least in part on the water traversal metric. Such embodiments may be particularly useful for distinguishing vehicle tows (i.e., tow trips) from vehicle ferry rides. As described herein, ferries represent a common cause of unpowered trips completed by vehicles. As will be appreciated, on ferries, vehicles generally traverse relatively large distances while being unpowered (i.e., without ignition engagement).

In more detail, the "zone" may be any type of identifiable geographical area. For example, in some embodiments, the zone may be a geohash of a selected resolution (e.g., a resolution of 4, 5, 6, 7, etc. digits). The zone being a "land zone" or a "water zone" may be determined based on, for example, the content of water therein. For instance, in some embodiments, the at least one processor may be further operated to receive map data (e.g., obtained from a map information provider such as OpenStreetMaps), identify, using the map data, a water content of the zone (e.g., based on surface area occupation), and determine, based on the water content being greater than a predetermined threshold, that the zone is a water zone or a land zone. In such embodiments, the predetermined threshold may be any suitable threshold—e.g., greater than 90%, 95%, 99%, etc. of the zone surface area being occupied by water.

The "water traversal metric" may be any metric that indicates an amount of water traversed by the at least one vehicle during the unpowered trip. For example, in some embodiments, the water traversal method may be a percentage of zones traversed by the at least one vehicle that are water zones, a number of consecutive water zones traversed by the at least one vehicle, of the like, or a combination thereof. For example, if a vehicle during an upwoered trip traverses five zones and 4 of the five zones are water zones, the unpowered trip may be identified to be a ferry ride—i.e., not a tow trip.

Referring back to FIG. 4, at operation 440, it is shown that, for each vehicle that completed a tow trip, a first powered trip completed prior to the unpowered trip and a second powered trip completed after the unpowered trip may be identified. As will be appreciated, a "powered trip" may refer to a change in location of a vehicle that was caused by the vehicle itself—i.e., using, for example, the engine thereof. In more detail, the first powered trip and the second powered trip may be, for example, a powered trip completed immediately prior to the unpowered trip (i.e., the last powered trip completed before the unpowered trip) and a powered trip completed immediately after the unpowered trip (i.e., a first powered trip completed after the unpowered trip), respectively.

The identifying of the first powered trip and the second powered trip may be performed using any suitable technique. For example, the first powered trip and the second powered trip may be identified based on factors opposite those used to identify the unpowered trip such as, but not limited to, based on a change in location of the at least one vehicle with an ignition thereof is engaged, with a change in engine RPM, with a change in engine road speed, with a change in odometer values, without an indicative debug log, or a combination thereof.

At operation 450 of the method 400, a vehicle downtime based at least in part on a time difference between an end time of the first powered trip and a start time of the second powered trip may be determined. That is, the determined vehicle downtime may be based at least in part on the last time the vehicle was operational before the tow trip and the first time the vehicle was operational after the tow trip.

Thus, the systems and methods of the present disclosure may be useful for determining vehicle downtime remotely (e.g., by a user such as a fleet manager) and may also avoid the shortcomings of the conventional techniques—e.g., easily track vehicle downtime, estimate the impact of total vehicle downtime on a vehicle fleet, etc.

Figure 5:
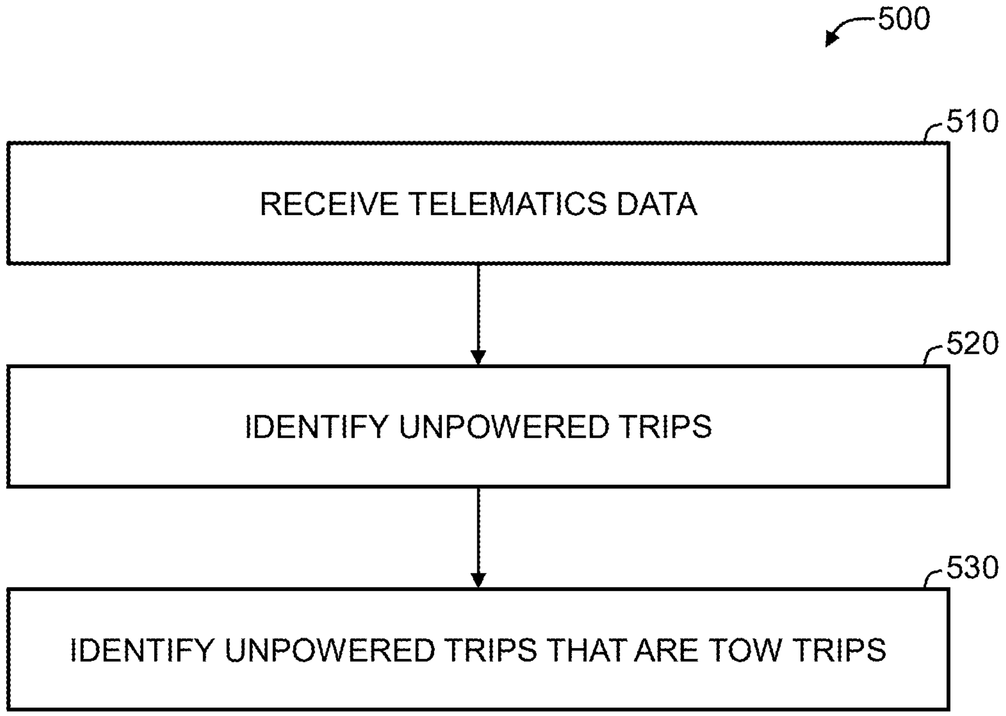
FIG. 5 is a flowchart of an example method for identifying a vehicle tow, according to an embodiment of the present disclosure

Further, as will be appreciated based on the above, the present disclosure may further provide systems and methods for identifying a vehicle tow. For example, in the embodiment illustrated in FIG. 5, a method for identifying a vehicle tow (500) may comprise operating at least one processor to: receive telematics data originating from a plurality of telematics devices installed in a plurality of vehicles (510); identify, using the telematics data, an unpowered trip completed by at least one vehicle of the plurality of vehicles (520); and identify each unpowered trip completed by the at least one vehicle that is a tow trip (530).

The method 500 may be implemented in the same manner as described above in relation to the method 400. For example, the operations 510, 520, and 530 of the method 500 may be implemented in the same manner as operations 410, 420, and 430 of the method 400, respectively.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for determining vehicle downtime, the system comprising:

at least one data storage operable to store telematics data originating from a plurality of telematics devices installed in a plurality of vehicles; and at least one processor in communication with the at least one data storage, the at least one processor operable to:

identify, using the telematics data, an unpowered trip completed by at least one vehicle of the plurality of vehicles;

identify each unpowered trip completed by the at least one vehicle that is a tow trip by:

identifying, using the telematics data, a zone traversed by the at least one vehicle during the unpowered trip, determining, for each zone traversed by the at least one vehicle, that the zone is a land zone or a water zone, determining, for each of the at least one vehicles, a water traversal metric indicating an amount of water traversed by the at least one vehicle during the unpowered trip, and determining that the unpowered trip is the tow trip based at least in part on the water traversal metric;

identify, for each vehicle that completed a tow trip, a first powered trip completed prior to the tow trip and a second powered trip completed after the tow trip; and determine, for each vehicle that completed a tow trip, a vehicle downtime based at least in part on a time difference between an end time of the first powered trip and an start time of the second powered trip.

2. The system of claim 1, wherein the at least one processor is operable to identify the unpowered trip based on a change in location of the at least one vehicle without an ignition thereof being engaged, without a change in engine RPM, without a change in engine road speed, without a change in odometer values, without an indicative debug log, or a combination thereof.

3. The system of 2, wherein the indicative debug log comprises a debug log indicating a relatively high voltage reading while the ignition of the at least one vehicle is disengaged.

4. The system of claim 1, wherein the at least one processor is operable to identify each unpowered trip that is the tow trip by determining that an endpoint of the unpowered trip is a service center.

5. The system of claim 4, wherein the at least one processor is operable to determine that the endpoint of the unpowered trip is the service center by determining that the endpoint of the unpowered trip is located proximate or within a service center zone.

6. The system of claim 1, wherein the at least one processor is operable to identify each unpowered trip that is the tow trip by filtering each unpowered trip based on a maximum speed of the at least one vehicle during the unpowered trip, a total duration of the unpowered trip, a total distance of the unpowered trip, a change in odometer values of the at least one vehicle as compared to the total distance of the unpowered trip, a change in odometer values of the at least one vehicle after the unpowered trip, or a combination thereof.

7. The system of claim 1, wherein the at least one processor is operable to identify each unpowered trip that is the tow trip by validating each unpowered trip as the towed trip by inputting into at least one machine learning model one or more telematics data features related to the unpowered trip.

8. The system of claim 7, wherein the one or more telematics data features related to the unpowered trip comprise a difference in odometer values after the unpowered trip, a total time of the unpowered trip, a total distance of the unpowered trip, an ignition status during the unpowered trip, a geographical distance between a start point and an endpoint of the unpowered trip, telematics device debug logs obtained during the unpowered trip, a CAN Bus error detected during the unpowered trip, the installation status of the telematics device after the unpowered trip, a CAN Bus error detected after the unpowered trip, a maximum speed of the vehicle during the unpowered trip, an RPM value before the unpowered trip, an RPM value after the unpowered trip, a transmission gear value during the unpowered trip, a telematics device status during the unpowered trip, a fault code detected during the unpowered trip, a fault code detected after the unpowered trip, or a combination thereof.

9. The system of claim 1, wherein the at least one processor is operable to identify the first powered trip and the second powered trip based on a change in location of the at least one vehicle with an ignition thereof is engaged, with a change in engine RPM, with a change in engine road speed, with a change in odometer values, without an indicative debug log, or a combination thereof.

10. The system of claim 1, wherein the first powered trip occurs immediately before the unpowered trip and the second powered trip occurs immediately after the unpowered trip.

11. A method for determining vehicle downtime, the method comprising operating at least one processor to:

receive telematics data originating from a plurality of telematics devices installed in a plurality of vehicles;

identify, using the telematics data, an unpowered trip completed by at least one vehicle of the plurality of vehicles;

identify each unpowered trip completed by the at least one vehicle that is a tow trip by:

identifying, using the telematics data, a zone traversed by the at least one vehicle during the unpowered trip, determining, for each zone traversed by the at least one vehicle, that the zone is a land zone or a water zone, determining, for each of the at least one vehicles, a water traversal metric indicating an amount of water traversed by the at least one vehicle during the unpowered trip, and determining that the unpowered trip is the tow trip based at least in part on the water traversal metric;

identify, for each vehicle that completed a tow trip, a first powered trip completed prior to the tow trip and a second powered trip completed after the tow trip; and determine, for each vehicle that completed a tow trip, a vehicle downtime based at least in part on a time difference between an end time of the first powered trip and an start time of the second powered trip.

12. The method of claim 11, wherein the identifying of the unpowered trip completed by the at least one vehicle comprises operating the at least one processor to identify the unpowered trip based on a change in location of the at least one vehicle without an ignition thereof being engaged, without a change in engine RPM, without a change in engine road speed, without a change in odometer values, without an indicative debug log, or a combination thereof.

13. The method of 12, wherein the indicative debug log comprises a debug log indicating a relatively high voltage reading while the ignition of the at least one vehicle is disengaged.

14. The method of claim 11, wherein the identifying of each unpowered trip that is the tow trip comprises operating the at least one processor to determine that an endpoint of the unpowered trip is a service center.

15. The method of claim 14, wherein the determining that the endpoint of the unpowered trip is the service center comprises operating the at least one processor to determine that the endpoint of the unpowered trip is located proximate or within a service center zone.

16. The method of claim 11, wherein the identifying of each unpowered trip that is the tow trip comprises operating the at least one processor to filter each unpowered trip based on a maximum speed of the at least one vehicle during the unpowered trip, a total duration of the unpowered trip, a total distance of the unpowered trip, a change in odometer values of the at least one vehicle as compared to the total distance of the unpowered trip, a change in odometer values of the at least one vehicle after the unpowered trip, or a combination thereof.

17. The method of claim 11, wherein the identifying of each unpowered trip that is the tow trip comprises operating the at least one processor to validate each unpowered trip as the towed trip by inputting into at least one machine learning model one or more telematics data features related to the unpowered trip.

18. The method of claim 17, wherein the one or more telematics data features related to the unpowered trip comprise a difference in odometer values after the unpowered trip, a total time of the unpowered trip, a total distance of the unpowered trip, an ignition status during the unpowered trip, a geographical distance between a start point and an endpoint of the unpowered trip, telematics device debug logs obtained during the unpowered trip, a CAN Bus error detected during the unpowered trip, the installation status of the telematics device after the unpowered trip, a CAN Bus error detected after the unpowered trip, a maximum speed of the vehicle during the unpowered trip, an RPM value before the unpowered trip, an RPM value after the unpowered trip, a transmission gear value during the unpowered trip, a telematics device status during the unpowered trip, a fault code detected during the unpowered trip, a fault code detected after the unpowered trip, or a combination thereof.

19. The method of claim 11, wherein the at least one processor is operable to identify the first powered trip and the second powered trip based on a change in location of the at least one vehicle with an ignition thereof is engaged, with a change in engine RPM, with a change in engine road speed, with a change in odometer values, without an indicative debug log, or a combination thereof.

20. The method of claim 11, wherein the first powered trip occurs immediately before the unpowered trip and the second powered trip occurs immediately after the unpowered trip.

21. A non-transitory computer-readable medium having instructions stored thereon executable by at least one processor to implement method for determining vehicle downtime, the method comprising operating at least one processor to:

receive telematics data originating from a plurality of telematics devices installed in a plurality of vehicles;

identify, using the telematics data, an unpowered trip completed by at least one vehicle of the plurality of vehicles;

identify each unpowered trip completed by the at least one vehicle that is a tow trip by:

identifying, using the telematics data, a zone traversed by the at least one vehicle during the unpowered trip, determining, for each zone traversed by the at least one vehicle, that the zone is a land zone or a water zone, determining, for each of the at least one vehicles, a water traversal metric indicating an amount of water traversed by the at least one vehicle during the unpowered trip, and determining that the unpowered trip is the tow trip based at least in part on the water traversal metric;

identify, for each vehicle that completed a tow trip, a first powered trip completed prior to the tow trip and a second powered trip completed after the tow trip; and determine, for each vehicle that completed a tow trip, a vehicle downtime based at least in part on a time difference between an end time of the first powered trip and an start time of the second powered trip.

* * * * *